(12) United States Patent
Yamashiro

(10) Patent No.: US 12,152,613 B2
(45) Date of Patent: Nov. 26, 2024

(54) FLUID PRESSURE CONTROL DEVICE

(71) Applicant: SMC CORPORATION, Tokyo (JP)

(72) Inventor: Tatsumasa Yamashiro, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 48 days.

(21) Appl. No.: 17/647,360

(22) Filed: Jan. 7, 2022

(65) Prior Publication Data

US 2022/0228608 A1 Jul. 21, 2022

(30) Foreign Application Priority Data

Jan. 19, 2021 (JP) ................................. 2021-006335

(51) Int. Cl.
*F15B 13/04* (2006.01)
*F15B 13/02* (2006.01)
(Continued)

(52) U.S. Cl.
CPC ........ *F15B 13/0433* (2013.01); *F15B 13/025* (2013.01); *F15B 19/005* (2013.01); *F15B 2211/526* (2013.01); *F15B 2211/5753* (2013.01); *F15B 2211/6316* (2013.01); *F15B 2211/632* (2013.01); *F15B 2211/67* (2013.01)

(58) Field of Classification Search
CPC .. F15B 13/0433; F15B 13/025; F15B 19/005; F15B 2211/526; F15B 2211/5753; F15B 2211/6316; F15B 2211/632; F15B 2211/67; F15B 13/0435; G05D 16/2095; G05D 16/2053; F04B 49/20; F04B 49/065; F04B 2205/05; Y10T 137/86051; Y10T 137/7797; Y10T 137/777; Y10T 137/261; Y10T 137/7794; F16K 31/126; F16K 31/1266

USPC ........ 137/494–510, 487.5–492.5; 251/30.02, 251/30.03, 30.05, 45, 46, 129.04

See application file for complete search history.

(56) References Cited

U.S. PATENT DOCUMENTS

| 2,328,279 A | * | 8/1943 | Jones | ...................... F23D 14/60 |
| | | | | 137/487 |
| 2,477,897 A | * | 8/1949 | Ray | .......................... F23N 5/067 |
| | | | | 251/30.01 |

(Continued)

FOREIGN PATENT DOCUMENTS

| DE | 10 2009 015 999 A1 | 10/2010 | |
| EP | 1867903 B1 * | 2/2011 | ............. F16K 31/06 |

(Continued)

OTHER PUBLICATIONS

Extended European Search Report issued May 27, 2022 in European Patent Application No. 22151308.8, 7 pages.

(Continued)

*Primary Examiner* — Craig J Price
(74) *Attorney, Agent, or Firm* — Oblon, McClelland, Maier & Neustadt, L.L.P.

(57) ABSTRACT

A pilot pressure supply solenoid valve (36) is disposed in a flow path connecting an inlet port (16) and a pilot chamber (48), and a pilot pressure discharge solenoid valve (38) is disposed in a flow path through which a pressure fluid in the pilot chamber is discharged to the exterior. A flow path, through which the pressure fluid that has passed through a supply valve (26) is discharged to the exterior, is not provided.

19 Claims, 7 Drawing Sheets

(51) Int. Cl.
*F15B 13/043* (2006.01)
*F15B 19/00* (2006.01)

(56) References Cited

U.S. PATENT DOCUMENTS

| | | | | |
|---|---|---|---|---|
| 2,819,701 A * | 1/1958 | Karassik | F22D 5/18 | 122/451 R |
| 2,973,935 A * | 3/1961 | Sullivan | F16K 31/42 | 236/80 R |
| 3,234,960 A * | 2/1966 | Brumm | G05D 16/163 | 137/637.1 |
| 3,252,477 A * | 5/1966 | Chard | F16K 31/04 | 92/100 |
| 3,654,963 A * | 4/1972 | Ages | F16K 31/128 | 251/30.01 |
| 3,863,714 A * | 2/1975 | Watson, Jr. | E21B 43/121 | 166/369 |
| 3,911,955 A * | 10/1975 | Link | F16K 31/004 | 251/30.02 |
| 3,957,244 A * | 5/1976 | Chauvigne | F16K 31/402 | 251/30.05 |
| 4,617,958 A * | 10/1986 | Seidel | G05D 16/2095 | 137/488 |
| 4,638,837 A * | 1/1987 | Buike | B62D 5/06 | 251/129.05 |
| 4,640,310 A * | 2/1987 | Hartle | B05B 7/1404 | 137/906 |
| 4,901,758 A * | 2/1990 | Cook | G05D 16/2053 | 137/489.5 |
| 4,951,705 A * | 8/1990 | Carey | G05D 16/2095 | 251/30.01 |
| 4,961,441 A * | 10/1990 | Salter | G05D 16/2053 | 251/30.02 |
| 5,042,775 A * | 8/1991 | Willemsen | F16K 31/402 | 222/14 |
| 5,065,665 A * | 11/1991 | Kimura | F15B 11/06 | 91/461 |
| 5,348,036 A * | 9/1994 | Oksanen | G05D 7/03 | 137/489.5 |
| 5,551,664 A * | 9/1996 | Boke | B67D 7/36 | 251/44 |
| 5,615,832 A * | 4/1997 | Price | B05B 7/2491 | 137/489.5 |
| 5,669,408 A * | 9/1997 | Nishino | G05D 7/0635 | 137/486 |
| 5,887,847 A * | 3/1999 | Holborow | F16K 31/42 | 251/30.02 |
| 6,244,561 B1 * | 6/2001 | Hansen, III | F25B 41/345 | 251/30.05 |
| 6,305,401 B1 * | 10/2001 | Uehara | G05D 16/2095 | 137/487.5 |
| 6,338,358 B1 * | 1/2002 | Watanabe | G05D 16/2093 | 251/30.01 |
| 6,568,416 B2 * | 5/2003 | Tucker | G05D 7/005 | 251/5 |
| 6,584,999 B2 * | 7/2003 | Inayama | G05D 16/2095 | 251/30.01 |
| 6,705,342 B2 * | 3/2004 | Santinanavat | G05D 16/2095 | 251/30.01 |
| 6,779,541 B2 * | 8/2004 | Inayama | G05D 16/2095 | 137/487.5 |
| 7,080,658 B2 * | 7/2006 | Ohmi | F16L 55/043 | 137/624.11 |
| 7,147,430 B2 * | 12/2006 | Wiggins | F02C 7/277 | 137/488 |
| 7,533,690 B2 * | 5/2009 | Reinicke | F16K 31/128 | 137/488 |
| 7,543,596 B2 * | 6/2009 | Laverdiere | G05D 7/0617 | 137/487 |
| 7,766,030 B2 * | 8/2010 | Askew | F15B 5/006 | 137/488 |
| 7,789,102 B2 * | 9/2010 | Beckman | F04B 49/20 | 137/505.11 |
| 7,814,750 B2 * | 10/2010 | Deeg | F16H 61/30 | 60/407 |
| 8,317,154 B2 * | 11/2012 | Kleegrewe | F15B 13/0438 | 137/83 |
| 8,783,284 B2 * | 7/2014 | Kato | H01M 8/04089 | 137/487 |
| 8,800,593 B2 * | 8/2014 | Sakasegawa | G01F 5/00 | 251/30.01 |
| 8,881,759 B1 * | 11/2014 | Shtekelmacher | F16K 31/402 | 251/30.02 |
| 9,062,798 B2 * | 6/2015 | Neef | F16K 47/04 | |
| 9,250,632 B2 * | 2/2016 | Tondolo | G05D 7/0617 | |
| 9,477,237 B2 * | 10/2016 | Muir | G05D 16/2053 | |
| 9,817,382 B2 * | 11/2017 | Tharaldson | G05D 16/2095 | |
| 9,909,682 B2 * | 3/2018 | Sneh | G05D 7/0113 | |
| 10,160,155 B2 * | 12/2018 | Zuercher | B29C 49/4289 | |
| 10,203,706 B2 * | 2/2019 | Davies | G05D 16/2095 | |
| 10,268,215 B2 * | 4/2019 | Masias | G05D 16/2095 | |
| 10,409,298 B2 * | 9/2019 | Ponzo | G05D 16/2013 | |
| 10,465,817 B2 * | 11/2019 | Sneh | F16K 31/128 | |
| 10,578,065 B1 * | 3/2020 | Yu | F16K 17/105 | |
| 10,663,983 B2 * | 5/2020 | Paulig | G05D 16/185 | |
| 10,670,163 B1 * | 6/2020 | Yu | F16K 31/02 | |
| 10,704,701 B1 * | 7/2020 | Yu | F16K 27/0209 | |
| 10,731,679 B2 * | 8/2020 | Unterdorfer | F15B 21/048 | |
| 10,732,650 B1 * | 8/2020 | Yu | G05D 16/2013 | |
| 11,269,363 B2 * | 3/2022 | Ferrarini | F15B 21/087 | |
| 11,441,580 B2 * | 9/2022 | Kurata | F16K 27/003 | |
| 11,549,606 B2 * | 1/2023 | Chowdhury | F02G 5/00 | |
| 11,867,318 B2 * | 1/2024 | Doi | B05B 1/005 | |
| 2003/0234051 A1 * | 12/2003 | Toivonen | F16K 31/402 | 137/554 |
| 2004/0061083 A1 * | 4/2004 | Cheng | F16K 31/128 | 251/30.01 |
| 2007/0291438 A1 * | 12/2007 | Ahrens | F16K 37/0083 | 361/160 |
| 2008/0023662 A1 | 1/2008 | Reinicke et al. | | |
| 2009/0248210 A1 * | 10/2009 | Arenas | G05D 16/2095 | 700/282 |
| 2012/0204974 A1 * | 8/2012 | Sakasegawa | G05D 7/005 | 137/489.5 |
| 2012/0319700 A1 * | 12/2012 | Keller | F16K 37/0075 | 324/617 |
| 2014/0158215 A1 * | 6/2014 | Maichl | F16K 37/0091 | 137/15.01 |
| 2014/0358303 A1 * | 12/2014 | Leonard | F15B 19/005 | 700/283 |
| 2015/0224620 A1 * | 8/2015 | Takahashi | B24B 37/30 | 451/442 |
| 2021/0034082 A1 * | 2/2021 | Ferrarini | F15B 21/087 | |

FOREIGN PATENT DOCUMENTS

| | | | | |
|---|---|---|---|---|
| JP | 2784154 B2 * | 8/1998 | | |
| JP | 2002-243059 A | 8/2002 | | |
| JP | 3634459 B2 * | 3/2005 | | |
| JP | 2014146244 A * | 8/2014 | | |
| WO | WO-2019186483 A1 * | 10/2019 | | F15B 21/08 |

OTHER PUBLICATIONS

Frank M. White, Fluid Mechanics, Seoul: the Korea MC Graw-Hill, Feb. 24, 2012; Seventh Board (pp. 439 and 440) with English translation (5 pages).

Office Action issued Jun. 19, 2024, in Korean Patent Application No. 10-2022-0004040 filed Jan. 11, 2022, citing document 23 therein, with English translation (16 pages).

* cited by examiner

FLUID PRESSURE CONTROL DEVICE

CROSS-REFERENCE TO RELATED APPLICATIONS

This application is based upon and claims the benefit of priority from Japanese Patent Application No. 2021-006335 filed on Jan. 19, 2021, the contents of which are incorporated herein by reference.

BACKGROUND OF THE INVENTION

Field of the Invention

The present invention relates to a fluid pressure control device configured to control a fluid pressure supplied to a fluid actuator.

Description of the Related Art

Conventionally, a fluid pressure control device has been known which adjusts the pressure of a pressure fluid from a fluid supply source to a desired pressure, and supplies the fluid to a fluid actuator. For example, JP 2002-243059 A discloses a fluid pressure adjusting device that opens and closes a supply valve element and a discharge valve element by controlling, using an air supply solenoid valve and an air discharge solenoid valve, a pilot pressure that acts on a diaphragm, to displace a rod member provided integrally with the diaphragm. In such a fluid pressure adjusting device, when the supply valve element is placed in an open state, a supply port connected to a fluid supply source and a pressure adjusting port connected to fluid pressure equipment communicate with each other, whereas when the discharge valve element is placed in an open state, the pressure fluid on the side of the pressure adjusting port is discharged to the exterior through a discharge port.

Further, a fluid control device that changes a target value of a fluid pressure supplied to a fluid actuator in accordance with an operating state of the fluid actuator is also known. For example, in the specification of U.S. Pat. No. 10,731,679 B2, a fluid control device is disclosed in which, when a decrease of a flow rate in a certain amount or more is detected, a transition is made from a normal operating mode to a standby mode, and at the time of the standby mode, a fluid having a pressure which is set to a lower pressure than at the time of the normal operating mode is supplied to the fluid actuator. Such a fluid control device has a configuration in which a shutoff valve is connected in series to and downstream of a proportional pressure regulating valve.

SUMMARY OF THE INVENTION

As seen in the fluid pressure adjusting device of JP 2002-243059 A, in order to control the pressure on the port side (secondary port side) that is connected to the fluid pressure equipment from a high pressure to a low pressure, it is common technical knowledge to use a discharge valve element. In this case, it is inevitable that a portion of the pressure fluid from the fluid supply source will end up being discarded without being used in the fluid pressure equipment. The proportional pressure regulating valve disclosed in the specification of U.S. Pat. No. 10,731,679 B2 is also equipped with a port for discharging fluid on the secondary side, and therefore a similar phenomenon occurs.

Further, in the fluid control device disclosed in the specification of U.S. Pat. No. 10,731,679 B2, a configuration is required in which a shutoff valve is connected in series to and downstream of a proportional pressure regulating valve, and since the shutoff valve is provided in a flow path having a large flow rate, there is a concern that the size and scale of the device may become large. Furthermore, in the fluid control device disclosed in the specification of U.S. Pat. No. 10,731,679 B2, it is necessary to provide a flow rate sensor in addition to a pressure sensor.

The present invention has the object of solving the aforementioned problems.

A fluid pressure control device according to the present invention is disposed between a fluid supply source and a fluid actuator, and is configured to transition from a normal mode, in which a fluid pressure supplied to the fluid actuator is set to an operating pressure, to a standby mode, in which the fluid pressure is set to a standby pressure that is lower than the operating pressure. In addition, the fluid pressure control device comprises an inlet port connected to the fluid supply source, an outlet port connected to the fluid actuator, a supply valve configured to adjust an area of a flow path connecting the inlet port and the outlet port, and a diaphragm configured to displace a valve element of the supply valve.

A pilot chamber is formed on one side of the diaphragm, and a feedback chamber communicating with the outlet port is formed on another side of the diaphragm. A pilot pressure supply solenoid valve is disposed in a flow path connecting the inlet port and the pilot chamber, and a pilot pressure discharge solenoid valve is disposed in a flow path through which a pressure fluid in the pilot chamber is discharged to an exterior. Furthermore, the fluid pressure control device further comprises a control unit configured to control the pilot pressure supply solenoid valve and the pilot pressure discharge solenoid valve. The fluid pressure control device does not comprise a flow path through which the pressure fluid that has passed through a gap between the valve element and a valve seat of the supply valve (passed through the supply valve) is discharged to the exterior.

According to the above-described fluid pressure control device, all of the pressure fluid that has passed through the supply valve is supplied to the fluid actuator, and loss of the pressure fluid can be suppressed to a minimum. Further, while performing a control to change a target value (set pressure) of the fluid pressure supplied to the fluid actuator from a high operating pressure to a low standby pressure, the fluid pressure control device does not include a flow path through which the pressure fluid that has passed through the supply valve is discharged to the exterior. Therefore, there is no need to separately provide a shutoff valve, and the device as a whole can be made small in scale.

According to the present invention, when transitioning from the normal mode to the standby mode, the fluid pressure control device performs a control to change the target value of the fluid pressure supplied to the fluid actuator from the high operating pressure to the low standby pressure, but the fluid pressure control device does not include a flow path through which the pressure fluid that has passed through the supply valve is discharged to the exterior. Therefore, in addition to enabling a loss of the pressure fluid to be suppressed to a minimum, there is no need to separately provide a shutoff valve, and the device as a whole can be made small in scale.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
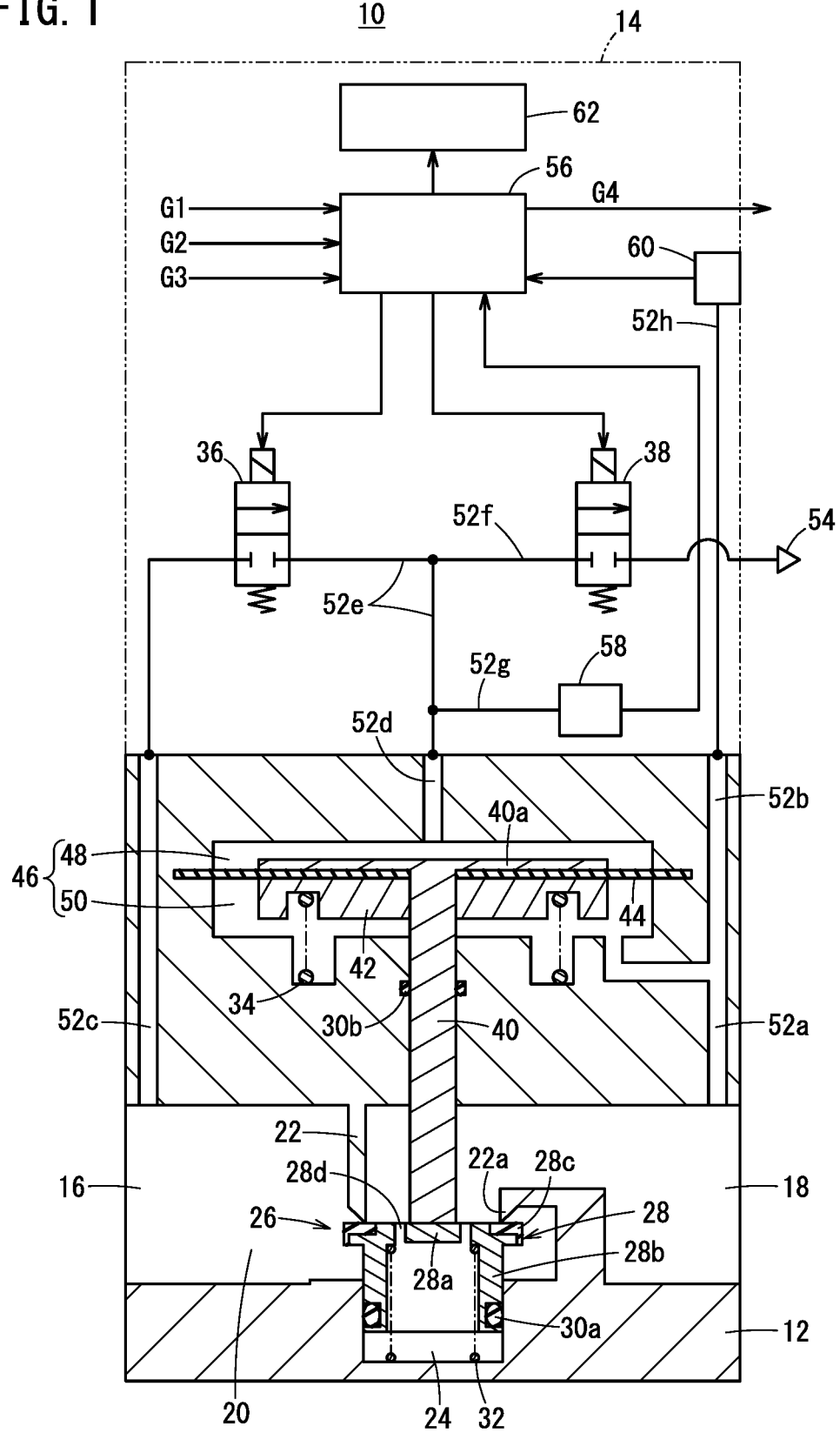
FIG. 1 is a schematic drawing of a fluid pressure control device according to an embodiment of the present invention.

The fluid used in the present invention is a pressure fluid such as compressed air or the like. In the following description, when terms in relation to up and down directions are used, such terms refer to the directions shown in the drawings for the sake of convenience, and the actual arrangement of the constituent members and the like is not necessarily limited to this feature.

A fluid pressure control device 10 according to an embodiment of the present invention is disposed between a fluid supply source and a fluid actuator (neither of which is shown). When a flow rate flowing toward the fluid actuator falls continuously below a predetermined value for a predetermined time period, the fluid pressure control device 10 sets the fluid pressure supplied to the fluid actuator to a standby pressure which is lower than an operating pressure. First, a description will be given concerning the configurations and functions possessed by the fluid pressure control device 10 in order to perform such a control.

As shown in FIG. 1, the fluid pressure control device 10 comprises a valve body 12 in which a supply valve 26 is incorporated, and a control housing 14 in which a pilot pressure supply solenoid valve 36 and a pilot pressure discharge solenoid valve 38 are incorporated. The control housing 14 is connected to an upper part of the valve body 12.

The valve body 12 includes an inlet port 16 connected to a fluid supply source (air compressor), and an outlet port 18 connected to a fluid actuator such as an air cylinder or the like. The inlet port 16 and the outlet port 18 are disposed coaxially. A cylindrical wall portion 22 having a valve seat 22a at an end part thereof intersects with a connecting passage 20 that connects the inlet port 16 and the outlet port 18. At a position facing toward the wall portion 22, a circular recess 24 that extends downward from the connecting passage 20 is disposed.

A valve element 28 constitutes the supply valve 26 together with the valve seat 22a. The valve element 28 is made up from a disk-shaped plate portion 28a capable of abutting against the valve seat 22a, and a cylindrical guide portion 28b that extends downward from a lower surface of the plate portion 28a. A seal member 28c that abuts against the valve seat 22a is mounted on an outer circumference of an upper part of the plate portion 28a. The seal member 28c is constituted by an elastic material such as rubber or the like.

The guide portion 28b of the valve element 28 is supported so as to be capable of sliding in up and down directions in the recess 24 of the valve body 12. A seal ring 30a that is in sliding contact with a wall surface of the recess 24 is mounted on an outer circumference of the guide portion 28b. In a space on an inner side of the guide portion 28b, a first spring 32 for biasing the valve element 28 toward the valve seat 22a is disposed between the lower surface of the plate portion 28a and a bottom surface of the recess 24. The plate portion 28a includes a plurality of holes 28d that allows communication between the space on the inner side of the guide portion 28b and a space above the plate portion 28a.

In a central portion of the valve body 12, an elongated rod 40 that extends in the up and down directions is supported so as to be capable of moving in an axial direction thereof. A seal ring 30b that is in sliding contact with an outer circumference of the rod 40 is disposed on the valve body 12. An upper end of the rod 40 integrally includes a disk-shaped flange portion 40a that extends in a horizontal direction. A lower end of the rod 40 projects into the connecting passage 20, and is capable of abutting against an upper surface of the plate portion 28a of the valve element 28.

When the seal member 28c of the valve element 28 is placed in a state of being pressed against the valve seat 22a due to the biasing force of the first spring 32, communication between the inlet port 16 and the outlet port 18 is shut off. On the other hand, as will be discussed later, when a force, which drives the valve element 28 downward against the biasing force of the first spring 32, acts on the rod 40, the seal member 28c of the valve element 28 separates away from the valve seat 22a, and the inlet port 16 and the outlet port 18 communicate with each other. In this case, the area of the flow path connecting the inlet port 16 and the outlet port 18 (a degree of opening V of the supply valve 26) is adjusted in accordance with the driving force that acts on the rod 40.

The upper part of the valve body 12 includes a diaphragm chamber 46. In the diaphragm chamber 46, there are accommodated an upper portion of the rod 40 including the flange portion 40a, and a diaphragm 44 that is made of a flexible material. An outer circumferential portion of the diaphragm 44 is attached to a groove portion that is formed in the valve body 12. An inner circumferential portion of the diaphragm 44 is sandwiched between the flange portion 40a of the rod 40 and a disc member 42 that is inserted over and fixed to the rod 40. Consequently, the inner circumferential portion of the diaphragm 44 is fixed to the rod 40.

The diaphragm chamber 46 is partitioned into a pilot chamber 48 and a feedback chamber 50. The pilot chamber 48 is formed upwardly of the diaphragm 44 and the flange portion 40a. The feedback chamber 50 is formed downwardly of the diaphragm 44 and the disc member 42. The feedback chamber 50 communicates with the outlet port 18 via a first passage 52a that is formed in the valve body 12. A second spring 34 is disposed in the feedback chamber 50.

One end of the second spring 34 abuts against the disc member 42. Another end of the second spring 34 abuts against the valve body 12.

Due to the fluid pressure in the pilot chamber 48 acting on upper surfaces of the diaphragm 44 and the flange portion 40a, a downward pushing force acts on the rod 40. Further, due to the fluid pressure in the feedback chamber 50 acting on lower surfaces of the diaphragm 44 and the disc member 42, and a biasing force of the second spring 34, an upward pushing force acts on the rod 40. When the former force exceeds the latter force, the rod 40 drives the valve element 28 downward against the biasing force of the first spring 32, and displaces the valve element 28 downward to a position balanced with the reaction force of the first spring 32. If a pressure P1 in the pilot chamber 48 is increased, the degree of opening V of the supply valve 26 becomes larger.

The valve body 12 includes a second passage 52b that branches off from the first passage 52a, and reaches an upper surface of the valve body 12. Further, the valve body 12 additionally includes a third passage 52c and a fourth passage 52d. A lower end of the third passage 52c is connected to the inlet port 16. An upper end of the third passage 52c reaches the upper surface of the valve body 12. A lower end of the fourth passage 52d is connected to the pilot chamber 48. An upper end of the fourth passage 52d reaches the upper surface of the valve body 12. The control housing 14 includes a fifth passage 52e that connects the upper end of the third passage 52c and the upper end of the fourth passage 52d to each other. The pilot pressure supply solenoid valve 36 is disposed in the fifth passage 52e. The pilot pressure supply solenoid valve 36 is a normally closed type two-way valve that is capable of being switched between a position to allow communication between the third passage 52c and the fourth passage 52d, and a position to shut off the communication between the third passage 52c and the fourth passage 52d.

Accordingly, the pilot pressure supply solenoid valve 36 can be switched between a communicating position to allow the pressure fluid in the inlet port 16 to be introduced into the pilot chamber 48, and a shutoff position to shut off the pilot chamber 48 from the inlet port 16. The pilot pressure supply solenoid valve 36 is disposed in a flow path connecting the inlet port 16 and the pilot chamber 48. Since the pilot pressure supply solenoid valve 36 is not interposed in a flow path having a large flow rate, a small scale solenoid valve is sufficient.

The control housing 14 comprises a discharge port 54 that is open to the atmosphere. In order to connect the upper end of the fourth passage 52d and the discharge port 54, the control housing 14 includes a sixth passage 52f that branches off from a midway location of the fifth passage 52e, and reaches the discharge port 54. The pilot pressure discharge solenoid valve 38 is disposed in the sixth passage 52f. The pilot pressure discharge solenoid valve 38 is a normally closed type two-way valve that is capable of being switched between a position to allow communication between the fourth passage 52d and the discharge port 54, and a position to shut off the communication between the fourth passage 52d and the discharge port 54. As such, the sixth passage communicates with the inlet port 16 but not with the outlet port 18.

Accordingly, the pilot pressure discharge solenoid valve 38 can be switched between a communicating position to allow the pressure fluid in the pilot chamber 48 to be discharged, and a shutoff position to shut off the pilot chamber 48 from the discharge port 54. The pilot pressure discharge solenoid valve 38 is disposed in a flow path through which the pressure fluid in the pilot chamber 48 is discharged to the exterior. Since the pilot pressure discharge solenoid valve 38 is not interposed in a flow path having a large flow rate, a small scale solenoid valve is sufficient. Further, since the volume of the pilot chamber 48 is limited and the amount of the pressure fluid in the pilot chamber 48 discharged to the exterior is extremely small, loss of the pressure fluid can be kept to a minimum.

A control unit 56 made up from an integrated circuit (IC) is disposed in the control housing 14. The pilot pressure supply solenoid valve 36 and the pilot pressure discharge solenoid valve 38 are controlled on the basis of signals from the control unit 56. When the pilot pressure supply solenoid valve 36 is switched to the communicating position and the pilot pressure discharge solenoid valve 38 is switched to the shutoff position, the pressure fluid in the inlet port 16 is introduced into the pilot chamber 48. Consequently, the pressure P1 in the pilot chamber 48 increases, and the degree of opening V of the supply valve 26 becomes larger. When the pilot pressure supply solenoid valve 36 is switched to the shutoff position and the pilot pressure discharge solenoid valve 38 is switched to the communicating position, the pressure fluid in the pilot chamber 48 is discharged to the exterior. Consequently, the pressure P1 in the pilot chamber 48 decreases, and the degree of opening V of the supply valve 26 becomes smaller.

In the case that the pilot pressure supply solenoid valve 36 and the pilot pressure discharge solenoid valve 38 are PWM-controlled, the pressure P1 in the pilot chamber 48 can be finely controlled by controlling the timing at which current is supplied to the solenoid valves 36 and 38, and therefore, the degree of opening V of the supply valve 26 can be adjusted in a stepless manner.

The control housing 14 includes a seventh passage 52g that branches off from a midway location of the fifth passage 52e. A first pressure sensor 58 that detects the pressure P1 in the pilot chamber 48 is disposed so as to face the seventh passage 52g. Further, the control housing 14 includes an eighth passage 52h connected to the second passage 52b of the valve body 12. A second pressure sensor 60 that detects a pressure P2 in the outlet port 18 is disposed so as to face the eighth passage 52h. Signals detected by the first pressure sensor 58 and the second pressure sensor 60 are input to the control unit 56.

An operating pressure Ps1, which is a set pressure in a normal mode (at a time of normal operation), a standby pressure Ps2, which is a set pressure in a standby mode, a flow rate threshold value L, and a monitoring time period T are stored in the control unit 56. These values can be arbitrarily set and modified by a user, and are fed into the control unit 56 as input signals G1. The operating pressure Ps1 is a target value (set pressure) of the fluid pressure supplied to the fluid actuator when the fluid actuator is operating. The standby pressure Ps2 is a target value (set pressure) of the fluid pressure supplied to the fluid actuator when the fluid actuator is in a paused state. The standby pressure Ps2 is lower than the operating pressure Ps1.

A standby release signal G2 for returning from the standby mode to the normal mode is input as a pulse signal to the control unit 56 from the exterior. In the case that a change from the normal mode to the standby mode is made capable of being manually performed, a mode switching signal G3 is input to the control unit 56 from the exterior. Further, a pressure display unit 62, which is capable of displaying the set operating pressure Ps1 and the set standby pressure Ps2 together with displaying the pressure P2 in the outlet port 18, is connected to the control unit 56. Moreover, the control unit 56 is capable of outputting the pressure P2 in the outlet port 18 and a later-described estimated flow rate Qe as output signals G4 to the exterior.

Figure 2:
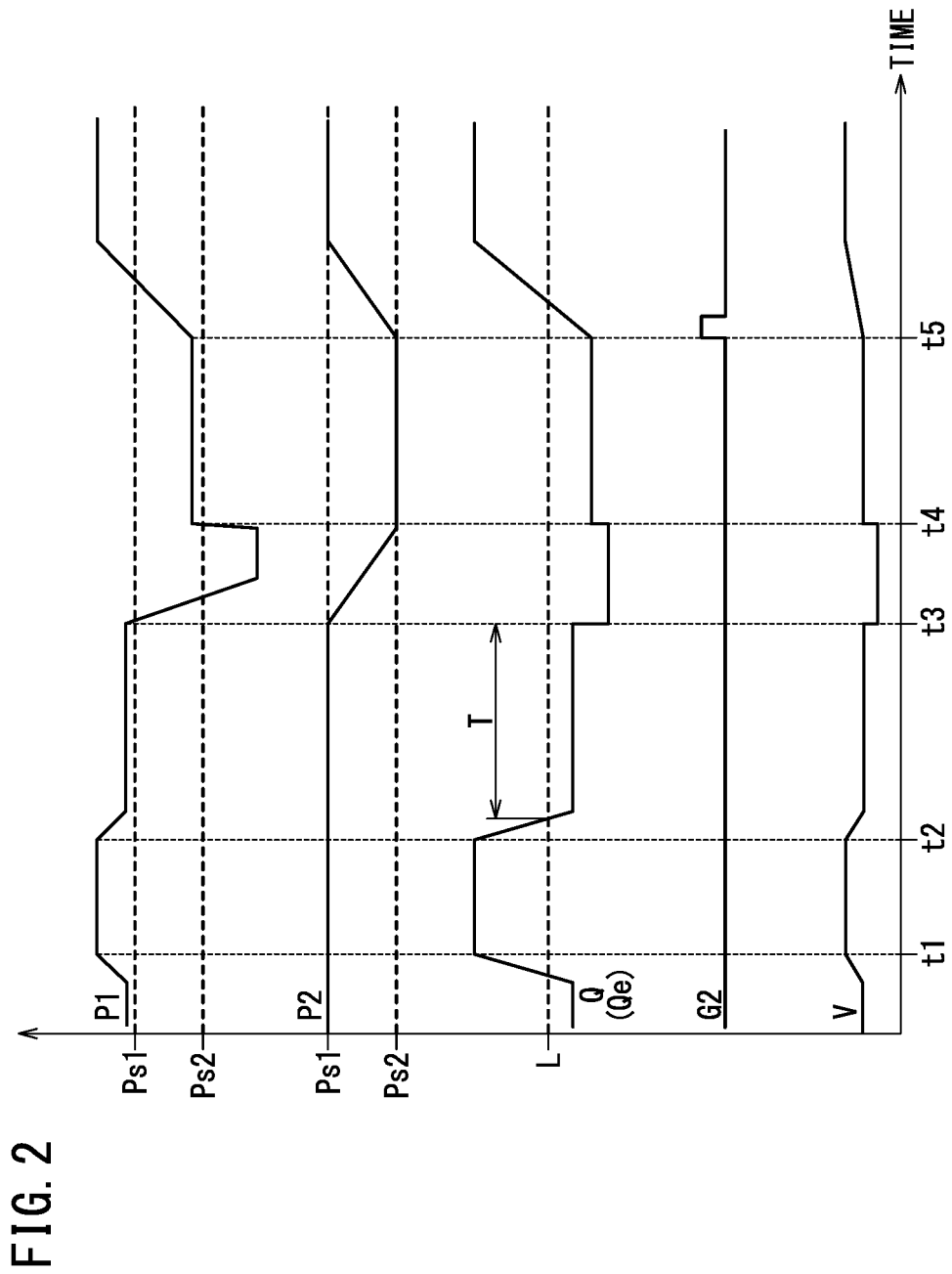
FIG. 2 is a timing chart showing operations of the fluid pressure control device shown in FIG. 1, for a case in which transitioning from a normal mode to a standby mode is automatically performed.

The fluid pressure control device 10 according to the present embodiment is provided with the aforementioned configurations and functions. Next, a description will be given with reference to FIGS. 1 to 3, concerning a control for a case in which transitioning from the normal mode to the standby mode is automatically performed. A state, in which the fluid actuator is in the operating state and the fluid pressure control device 10 is operating in the normal mode, is regarded as an initial state. Referring to FIG. 2, for example, the state at time t2 corresponds to such an initial state.

When the fluid pressure control device 10 is operating in the normal mode, the control unit 56 controls the operations of the pilot pressure supply solenoid valve 36 and the pilot pressure discharge solenoid valve 38, and thereby adjusts the degree of opening V of the supply valve 26 in a manner so that the pressure P2 in the outlet port 18, which is detected by the second pressure sensor 60, coincides with a target value, which is the operating pressure Ps1. Consequently, the pressure P2 in the outlet port 18 is maintained at the set operating pressure Ps1. When the fluid actuator is in the operating state, the pressure P1 in the pilot chamber 48 significantly exceeds the pressure P2 in the outlet port 18 that is maintained at the operating pressure Ps1, and the degree of opening V of the supply valve 26 is also sufficiently large (from time t1 to time t2).

Even when the fluid pressure control device 10 is operating in the normal mode, in the case that the pressure P2 in the outlet port 18 is greater than the operating pressure Ps1, and further, the pressure P1 in the pilot chamber 48 is less than or equal to a predetermined value, the pilot pressure discharge solenoid valve 38 is set to the shutoff position. The reason therefor is as follows.

Depending on the operating condition of the fluid actuator, even if the pilot pressure discharge solenoid valve 38 is maintained at the communicating position, cases may occur in which the pressure P2 in the outlet port 18 does not become less than or equal to the operating pressure Ps1. Further, even if the pilot pressure discharge solenoid valve 38 is maintained at the communicating position, cases may occur in which the pressure P1 in the pilot chamber 48 is not lowered to atmospheric pressure. Accordingly, a value which is slightly greater than atmospheric pressure (for example, 5 kPa in gauge pressure) is set as a predetermined value Pk, and in the case that the inequalities P2>Ps1 and P1≤Pk are satisfied, the pilot pressure discharge solenoid valve 38 is set to the shutoff position. This is because supplying electrical power to the pilot pressure discharge solenoid valve 38 and maintaining it at the communicating position leads to the electrical power being needlessly consumed. It should be noted that such a situation is not depicted in the timing chart of FIG. 2.

When the fluid pressure control device 10 is operating in the normal mode, the control unit 56 estimates the flow rate of the fluid flowing toward the fluid actuator (the flow rate Q of the fluid passing through the supply valve 26) based on the signals detected by the first pressure sensor 58 and the second pressure sensor 60. The method of estimating the flow rate Q is as follows.

Figure 3:
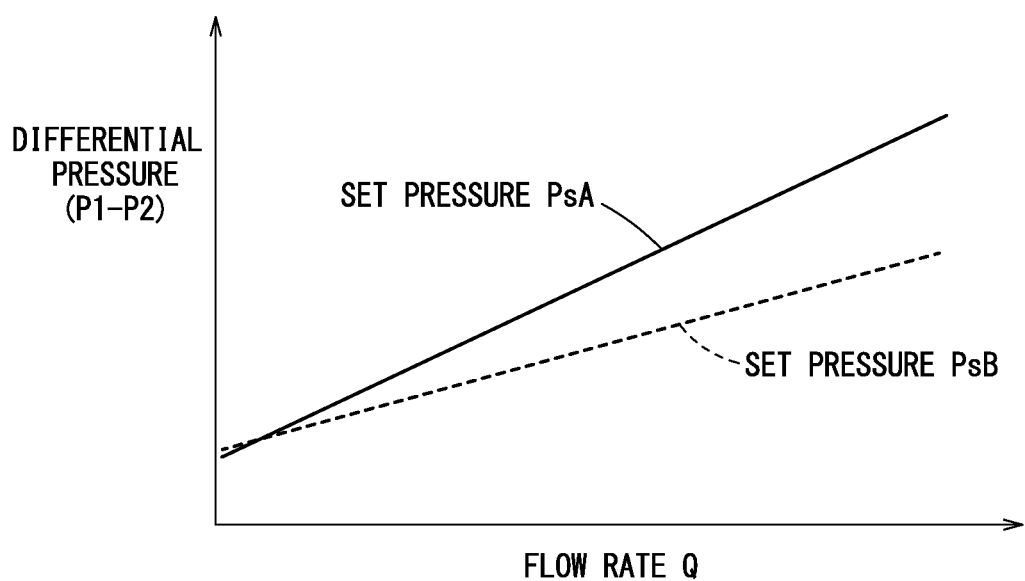
FIG. 3 is a graph showing a relationship between a differential pressure (P1-P2) and a flow rate Q in the fluid pressure control device shown in FIG. 1.

The flow rate Q becomes greater as the differential pressure between the pressure P1 in the pilot chamber 48 and the pressure P2 in the outlet port 18 becomes greater. Further, the flow rate Q differs depending on the set pressure, even if the differential pressure between the pressure P1 in the pilot chamber 48 and the pressure P2 in the outlet port 18 is the same. FIG. 3 is a graph showing a relationship between the differential pressure (P1−P2) between the pressure P1 in the pilot chamber 48 and the pressure P2 in the outlet port 18, and the flow rate Q, with the set pressure serving as a parameter. More specifically, with the set pressure being set to the two values PsA and PsB (PA<PB), the pressure P1 in the pilot chamber 48, the pressure P2 in the outlet port 18, and the flow rate Q are actually measured using the pressure sensors and a flow rate sensor, and are shown based on the obtained data. As can be understood from FIG. 3, the relationship between the differential pressure (P1−P2) and the flow rate Q is approximated by a straight line, and the slope thereof differs depending on the set pressure.

Thus, for the flow rate Q of the fluid passing through the supply valve 26, the estimated flow rate Qe is obtained by the following expression, where K is a constant corresponding to the set pressure (a constant corresponding to the set value of the operating pressure Ps1).

$Qe=K(P1-P2)$

The control unit 56 has stored therein a table relating to the constant K as determined for each of set pressures, and calculates the estimated flow rate Qe based on signals input from the first pressure sensor 58 and the second pressure sensor 60.

In this manner, by including the second pressure sensor 60 in addition to the first pressure sensor 58, the fluid pressure control device 10 can estimate the flow rate of the fluid flowing toward the fluid actuator. Therefore, the fluid pressure control device 10 does not require a flow rate sensor. In the case of wanting to improve the accuracy with which the flow rate is estimated, a pressure sensor that detects the pressure in the inlet port 16, and a temperature sensor that detects the temperature of the fluid passing through the supply valve 26 may be added, and in addition to the set pressure, a table relating to a constant (K') that is set by also taking into consideration the pressure in the inlet port 16 and the temperature of the fluid may be used.

When the control unit 56 determines that the estimated flow rate Qe has continuously fallen below the predetermined flow rate threshold value L for the monitoring time period T (predetermined time period) in the normal mode, the control unit 56 considers that the fluid actuator has entered into the paused state, and determines to transition to the standby mode (time t3). In the standby mode, the control unit 56 controls the operations of the pilot pressure supply solenoid valve 36 and the pilot pressure discharge solenoid valve 38, and thereby adjusts the degree of opening V of the supply valve 26 in a manner so that the pressure P2 in the outlet port 18, which is detected by the second pressure sensor 60, coincides with a target value, which is the standby pressure Ps2. Consequently, the pressure P2 in the outlet port 18 is set to the standby pressure Ps2, which is lower than the operating pressure Ps1. Transitioning from the normal mode to the standby mode is automatically performed in this manner.

Immediately after transitioning from the normal mode to the standby mode and at least while the pressure P2 in the outlet port 18 falls from the operating pressure Ps1 to the standby pressure Ps2 (from time t3 to immediately before time t4), the supply valve 26 is controlled so as to be maintained in the closed position, and communication between the inlet port 16 and the outlet port 18 is shut off. This is because the pressure P2 in the outlet port 18, which is detected by the second pressure sensor 60, continues to remain higher than the standby pressure Ps2, which is the target value. Accordingly, the pressure fluid is not newly supplied from the fluid supply source toward the fluid actuator, and consumption of the pressure fluid becomes zero. At this time, the fluid that is accumulated in the fluid actuator gradually escapes.

The standby mode is a mode for preparing return of the fluid actuator in the paused state to the operating state. The fluid actuator does not need to be supplied with the pressure fluid in the paused state, however, by supplying the fluid at the standby pressure Ps2 beforehand, it is possible for the fluid actuator to be quickly and smoothly returned to the operating state. Moreover, while the fluid, which is at the standby pressure Ps2, is being supplied to the fluid actuator in the paused state, a constant leakage of the fluid occurs in the fluid actuator. The amount of such leakage is smaller than the amount of leakage that occurs in the case that the fluid, which is at the operating pressure Ps1, is supplied to the fluid actuator in the paused state.

Even when the fluid pressure control device 10 is operating in the standby mode, in the case that the pressure P2 in the outlet port 18 is greater than the standby pressure Ps2, and further, the pressure P1 in the pilot chamber 48 is less than or equal to the predetermined value, the pilot pressure discharge solenoid valve 38 is set to the shutoff position. This is because, similar to when operating in the normal mode, even if the pilot pressure discharge solenoid valve 38 is maintained at the communicating position, cases may occur in which the pressure P2 in the outlet port 18 does not become less than or equal to the standby pressure Ps2. Further, since the pressure P1 in the pilot chamber 48 is not lowered to atmospheric pressure, unnecessary operation of the pilot pressure discharge solenoid valve 38 is suppressed. It should be noted that such a situation is not depicted in the timing chart of FIG. 2.

Returning from the standby mode to the normal mode is performed in accordance with the standby release signal G2 (time t5). The standby release signal G2 is a pulse signal that is input to the control unit 56 from the exterior, in order to return the fluid actuator, which is in the paused state, to the operating state. For example, the signal may be a signal which is input by an operation performed by the user on a touch panel, or may be a signal which is automatically input at a time that is set by the user for resuming operation of the fluid actuator. When returning from the standby mode to the normal mode, in order to realize a soft start, the set pressure may be changed in a stepwise manner from the standby pressure Ps2 to the operating pressure Ps1. Further, returning to the normal mode need not necessarily be performed in accordance with the standby release signal G2, but may be performed at a time that the estimated flow rate Qe has become greater than the flow rate threshold value L.

Incidentally, in the fluid pressure control device 10, when transitioning from the normal mode to the standby mode, the set pressure of the outlet port 18 is changed from the high operating pressure Ps1 to the low standby pressure Ps2. However, the fluid pressure control device 10 is not provided with a valve that controls the change from the high pressure to the low pressure (a valve for discharging fluid from the outlet port 18). This is because, when the fluid actuator enters into the paused state, there is no need to rapidly cause the pressure P2 in the outlet port 18 to decrease to the standby pressure Ps2, and it is satisfactory to wait for the pressure P2 in the outlet port 18 to decrease naturally to the standby pressure Ps2 by allowing the fluid accumulated in the fluid actuator to escape to a certain extent. In the foregoing manner, since the fluid pressure control device 10 is not provided with a valve for discharging the fluid from the outlet port 18, loss of the pressure fluid can be suppressed.

Figure 4:
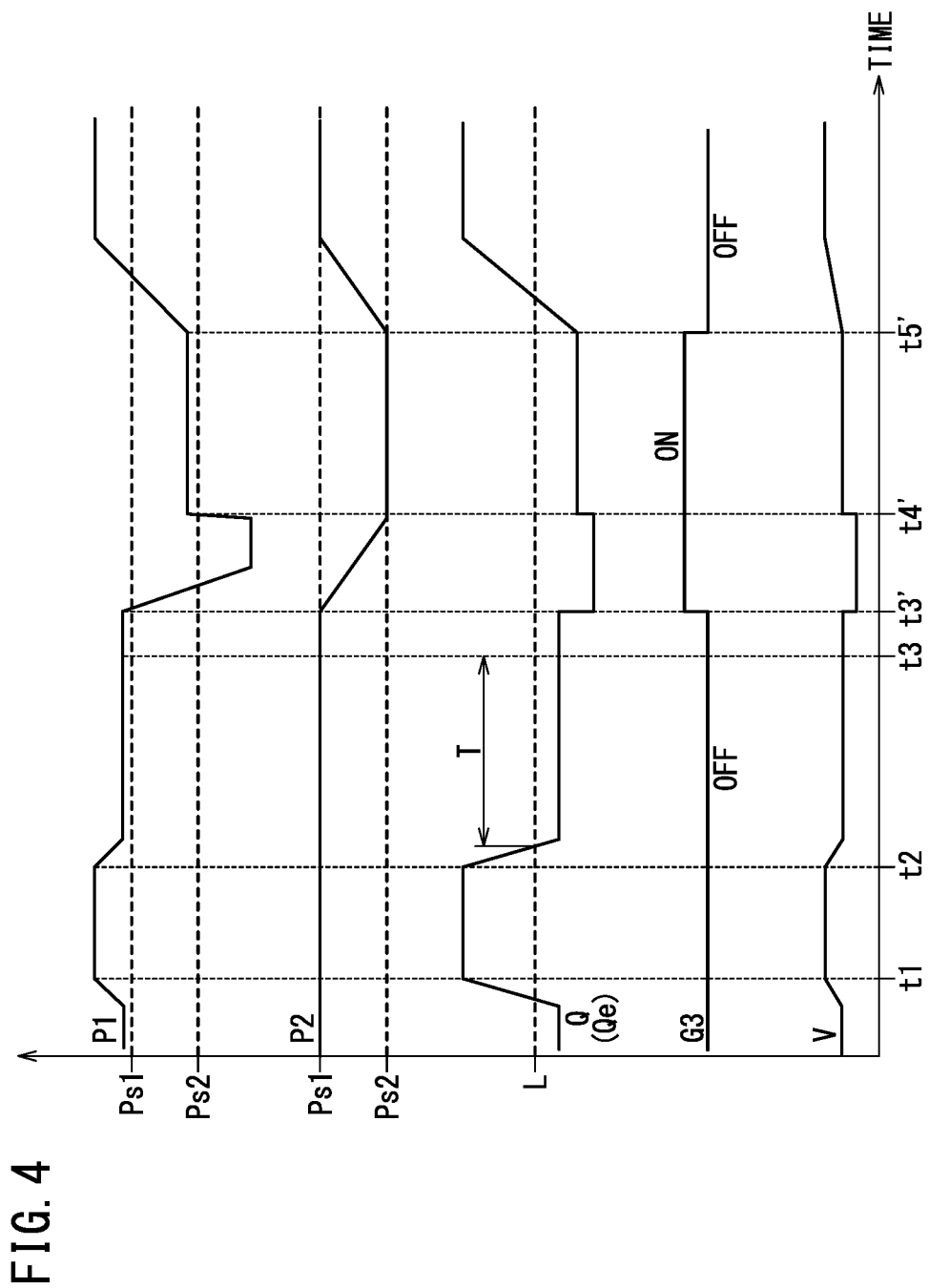
FIG. 4 is a timing chart showing operations of the fluid pressure control device shown in FIG. 1, for a case in which transitioning from a normal mode to a standby mode is performed manually.

Next, a description will be given with reference to FIG. 4, concerning a control for a case in which transitioning from the normal mode to the standby mode is manually performed.

Similar to the case in which transitioning from the normal mode to the standby mode is automatically performed, when the fluid pressure control device 10 is operating in the normal mode, the control unit 56 calculates the estimated flow rate Qe. In addition, at time t3, when the control unit 56 determines that the estimated flow rate Qe has continuously fallen below the flow rate threshold value L for the monitoring time period T, the control unit 56 waits for a change in the mode switching signal G3 which is manually input from the exterior. At time t3', when the mode switching signal G3 changes from OFF to ON, the control unit 56 determines to transition from the normal mode to the standby mode. Returning from the standby mode to the normal mode is performed in accordance with changing of the mode switching signal G3 from ON to OFF (time t5').

As noted previously, transitioning from the normal mode to the standby mode is performed on the condition that the mode switching signal G3 undergoes a change after the estimated flow rate Qe has continuously fallen below the flow rate threshold value L for the monitoring time period T. However, transitioning from the normal mode to the standby mode may be performed only on the condition that the mode switching signal G3 undergoes a change.

Figure 5:
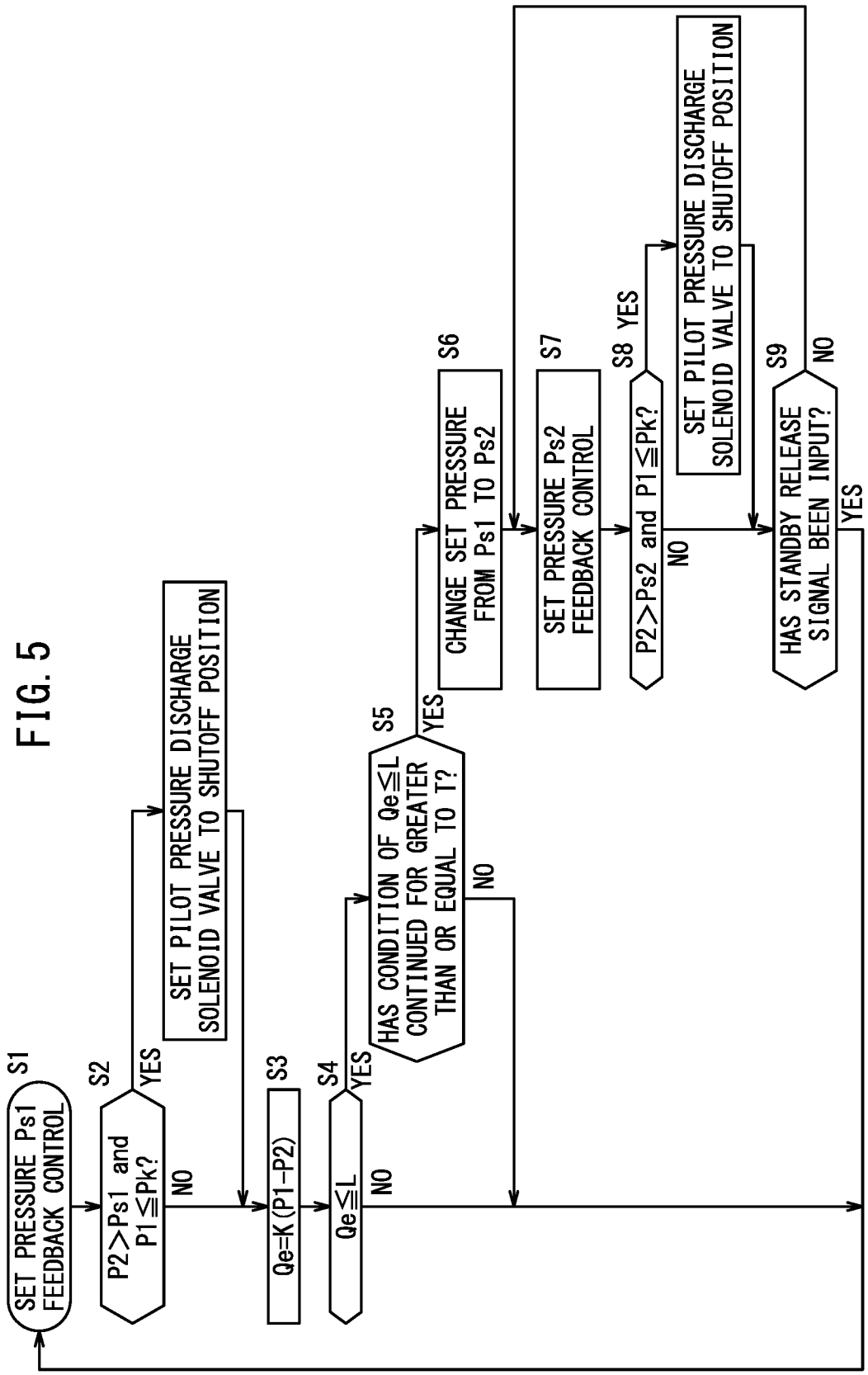
FIG. 5 is a flowchart showing a control by the fluid pressure control device shown in FIG. 1, for a case in which transitioning from a normal mode to a standby mode is automatically performed, and returning to the normal mode is performed by a standby release signal.
Figure 6:
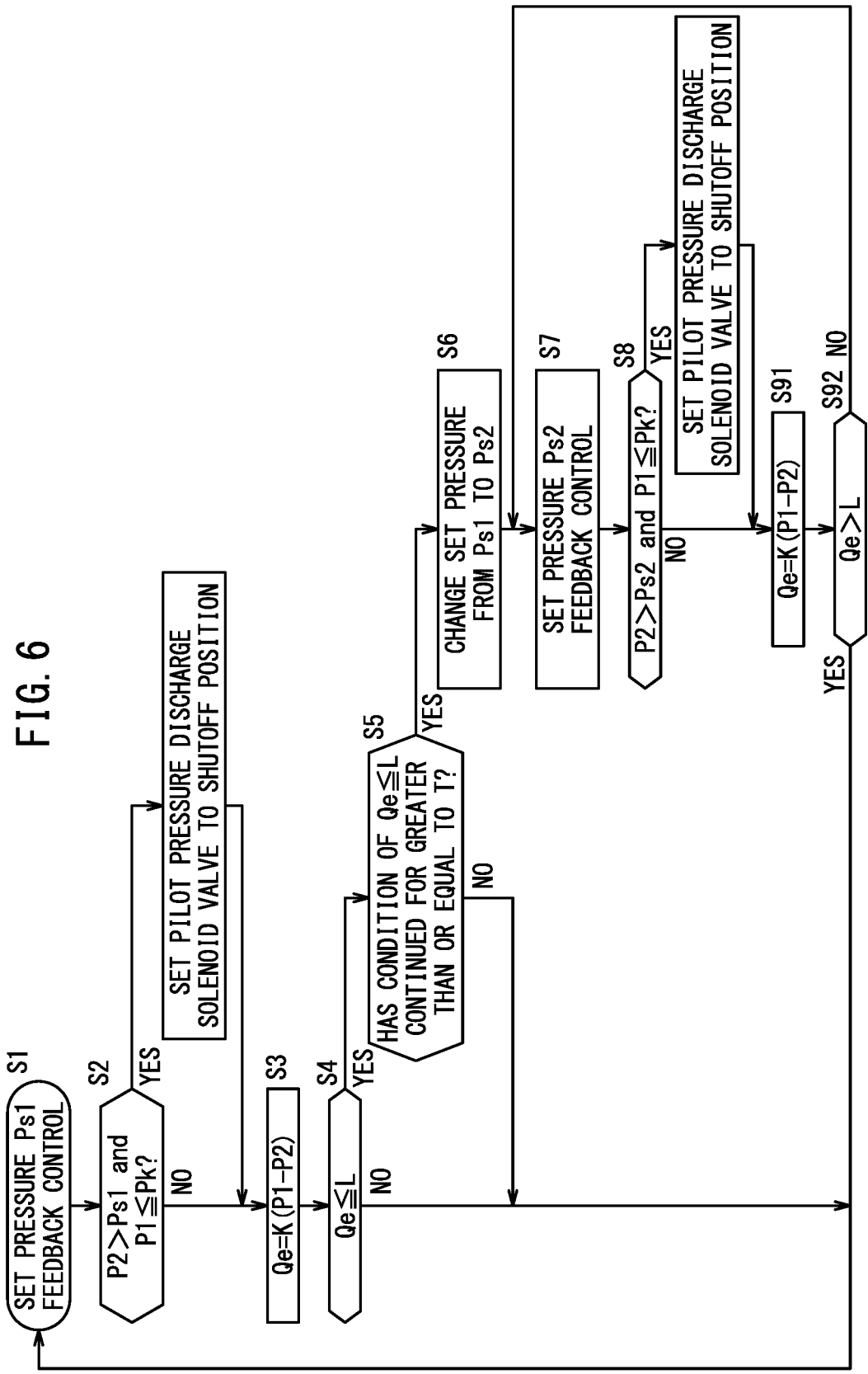
FIG. 6 is a flowchart showing a control by the fluid pressure control device shown in FIG. 1, for a case in which transitioning from a normal mode to a standby mode is automatically performed, and returning to the normal mode is automatically performed based on a flow rate.
Figure 7:
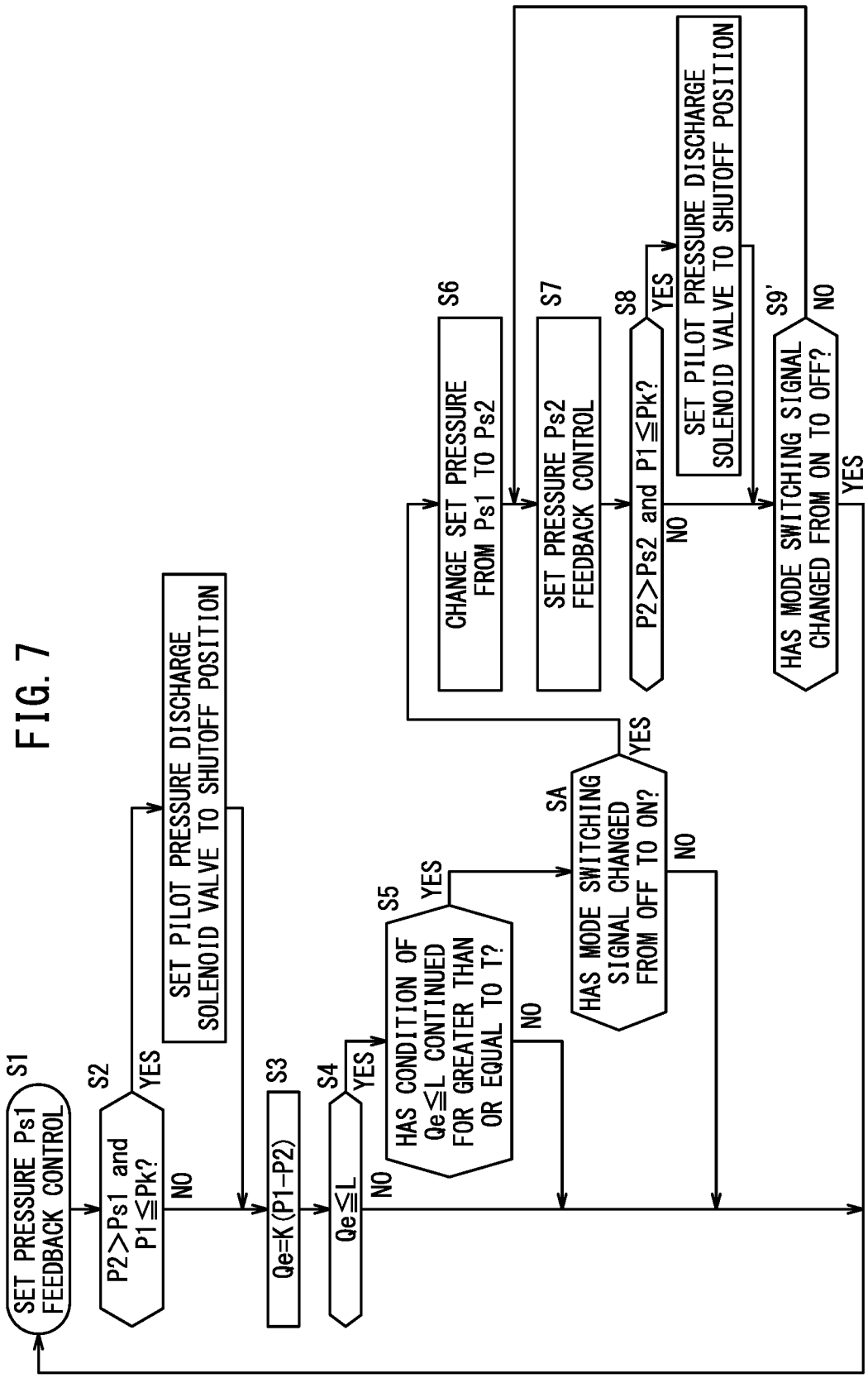
FIG. 7 is a flow chart showing a control by the fluid pressure control device shown in FIG. 1, for a case in which transitioning from a normal mode to a standby mode is performed manually.

Flowcharts for realizing the aforementioned controls are shown in FIGS. 5 to 7. FIG. 5 is a flowchart for a case in which transitioning from the normal mode to the standby mode is automatically performed, and returning to the normal mode is performed in accordance with the standby release signal G2. FIG. 6 is a flowchart for a case in which transitioning from the normal mode to the standby mode is automatically performed, and returning to the normal mode is automatically performed based on a flow rate. FIG. 7 is a flowchart for a case in which transitioning from the normal mode to the standby mode is performed manually.

In step S1 shown in FIG. 5, the control unit 56 reads the latest signals input from the first pressure sensor 58 and the second pressure sensor 60, and thereby acquires the pressure P1 in the pilot chamber 48 and the pressure P2 in the outlet port 18. Then, the control unit 56 compares the pressure P2 in the outlet port 18 with the operating pressure Ps1. When the pressure P2 in the outlet port 18 is less than the operating pressure Ps1, the control unit 56 controls the pilot pressure supply solenoid valve 36 and the pilot pressure discharge solenoid valve 38, and thereby increases the degree of opening V of the supply valve 26. When the pressure P2 in the outlet port 18 is greater than the operating pressure Ps1, the control unit 56 controls the pilot pressure supply solenoid valve 36 and the pilot pressure discharge solenoid valve 38, and thereby decreases the degree of opening V of the supply valve 26.

Next, upon proceeding to step S2, the control unit 56 determines whether or not the pressure P2 in the outlet port 18, which has been acquired in step S1, is greater than the operating pressure Ps1, and further, whether or not the pressure P1 in the pilot chamber 48, which has been acquired in step S1, is less than or equal to the predetermined value Pk. In the case that such a determination result is YES, the control unit 56 outputs, to the pilot pressure discharge solenoid valve 38, a signal for switching to the shutoff position, and then the process proceeds to step S3. In the case that the determination result is NO, the process immediately proceeds to step S3.

In step S3, the control unit 56 obtains the estimated flow rate Qe based on the pressure P1 in the pilot chamber 48 and the pressure P2 in the outlet port 18, which have been acquired in step S1, while referring to the table relating to the constant K, and then the process proceeds to step S4. In step S4, the control unit 56 compares the estimated flow rate Qe obtained in step S3 with the flow rate threshold value L, and in the case that the estimated flow rate Qe is less than or equal to the flow rate threshold value L, the process proceeds to step S5. In the case that the estimated flow rate Qe is greater than the flow rate threshold value L, the process returns to step S1.

In step S5, the control unit 56 determines whether or not a time period of greater than or equal to the monitoring time period T has elapsed since the estimated flow rate Qe has become less than or equal to the flow rate threshold value L. More specifically, the control unit 56 determines whether or not the state in which the estimated flow rate Qe is less than or equal to the flow rate threshold value L has continued for a time period of greater than or equal to the monitoring time period T. If the state in which the estimated flow rate Qe is less than or equal to the flow rate threshold value L has continued for a time period of greater than or equal to the monitoring time period T, the process proceeds to step S6. If the state in which the estimated flow rate Qe is less than or equal to the flow rate threshold value L has not continued for a time period of greater than or equal to the monitoring time period T, the process returns to step S1. In step S6, in order to transition from the normal mode to the standby mode, the control unit 56 changes the set pressure from the operating pressure Ps1 to the standby pressure Ps2, and then the process proceeds to step S7.

In step S7, the control unit 56 reads the latest signals input from the first pressure sensor 58 and the second pressure sensor 60, and thereby acquires the pressure P1 in the pilot chamber 48 and the pressure P2 in the outlet port 18. Then, the control unit 56 compares the pressure P2 in the outlet port 18 with the standby pressure Ps2. When the pressure P2 in the outlet port 18 is less than the standby pressure Ps2, the control unit 56 controls the pilot pressure supply solenoid valve 36 and the pilot pressure discharge solenoid valve 38, and thereby increases the degree of opening V of the supply valve 26. When the pressure P2 in the outlet port 18 is greater than the standby pressure Ps2, the control unit 56 controls the pilot pressure supply solenoid valve 36 and the pilot pressure discharge solenoid valve 38, and thereby decreases the degree of opening V of the supply valve 26.

Next, upon proceeding to step S8, the control unit 56 determines whether or not the pressure P2 in the outlet port 18, which has been acquired in step S7, is greater than the standby pressure Ps2, and further, whether or not the pressure P1 in the pilot chamber 48, which has been acquired in step S7, is less than or equal to the predetermined value Pk. In the case that such a determination result is YES, the control unit 56 outputs, to the pilot pressure discharge solenoid valve 38, a signal for switching to the shutoff position, and then the process proceeds to step S9. In the case that the determination result is NO, the process immediately proceeds to step S9.

In step S9, the control unit 56 determines whether or not the standby release signal G2 for returning from the standby mode to the normal mode has been input from the exterior. In the case that the standby release signal G2 has been input from the exterior, the process returns to step S1. In the case that the standby release signal G2 has not been input from the exterior, the process returns to step S7.

As shown in FIG. 6, the flowchart for a case in which returning to the normal mode is performed based on the flow rate is a flowchart in which step S91 and step S92 are provided instead of step S9 in the flowchart of FIG. 5. Hereinafter, a description will be given focusing on the changed portions.

In step S91, the control unit 56 obtains the estimated flow rate Qe based on the pressure P1 in the pilot chamber 48 and the pressure P2 in the outlet port 18, which have been acquired in step S7, while referring to the table relating to the constant K, and then the process proceeds to step S92. In step S92, the control unit 56 compares the estimated flow rate Qe obtained in step S91 with the flow rate threshold value L. In the case that the estimated flow rate Qe is greater than the flow rate threshold value L, the process returns to step S1. In the case that the estimated flow rate Qe is less than or equal to the flow rate threshold value L, the process returns to step S7.

As shown in FIG. 7, the flowchart for a case in which transitioning from the normal mode to the standby mode is performed manually is a flowchart in which, in the flowchart of FIG. 5, step SA is added between steps S5 and S6, and step S9 is changed to step S9'. Hereinafter, a description will be given focusing on the added and changed portions.

In step S5, the control unit 56 determines whether or not the state in which the estimated flow rate Qe is less than or equal to the flow rate threshold value L has continued for a time period of greater than or equal to the monitoring time period T. If the state in which the estimated flow rate Qe is less than or equal to the flow rate threshold value L has continued for a time period of greater than or equal to the monitoring time period T, the process proceeds to step SA. If the state in which the estimated flow rate Qe is less than or equal to the flow rate threshold value L has not continued for a time period of greater than or equal to the monitoring time period T, the process returns to step S1.

In step SA, the control unit 56 determines whether or not the mode switching signal G3 has been changed from OFF to ON. In the case that the mode switching signal G3 has been changed from OFF to ON, the process proceeds to step S6. In the case that the mode switching signal G3 remains OFF, the process returns to step S1. In step S6, in order to transition from the normal mode to the standby mode, the control unit 56 changes the set pressure from the operating pressure Ps1 to the standby pressure Ps2, and then the process proceeds to step S7.

In step S9', the control unit 56 determines whether or not the mode switching signal G3 has been changed from ON to OFF. In the case that the mode switching signal G3 has been changed from ON to OFF, the process returns to step S1. In the case that the mode switching signal G3 remains ON, the process returns to step S7.

In accordance with the fluid pressure control device 10 according to the present embodiment, when transitioning from the normal mode to the standby mode, a control is performed to change the target value of the fluid pressure supplied to the fluid actuator from the high operating pressure Ps1 to the low standby pressure Ps2, but there is not included a flow path through which the pressure fluid that has passed through the supply valve 26 is discharged to the exterior. Therefore, in addition to enabling a loss of the pressure fluid to be suppressed to a minimum, there is no need to separately provide a shutoff valve, and the device as a whole can be made small in scale. Further, based on the detection signals of the first pressure sensor 58 that detects the pressure P1 in the pilot chamber 48, and the detection signals of the second pressure sensor 60 that detects the pressure P2 in the outlet port 18, the flow rate flowing toward the fluid actuator is estimated. Therefore, there is no need to provide a flow rate sensor, and the device as a whole can be made small in scale.

The present invention is not limited to the embodiment described above, and various configurations may be adopted therein without deviating from the essence and gist of the invention.

What is claimed is:

1. A fluid pressure control device disposed between a fluid supply source and a fluid actuator, and configured to transition from a normal mode in which a fluid pressure supplied to the fluid actuator is set to an operating pressure, to a standby mode in which the fluid pressure is set to a standby pressure that is lower than the operating pressure, the fluid pressure control device comprising:
   an inlet port connected to the fluid supply source;
   an outlet port connected to the fluid actuator;
   a supply valve configured to adjust an area of a flow path connecting the inlet port and the outlet port; and
   a diaphragm configured to displace a valve element of the supply valve, wherein
   a pilot chamber is formed on one side of the diaphragm,
   a feedback chamber communicating with the outlet port is formed on another side of the diaphragm,
   a pilot pressure supply solenoid valve is disposed in a flow path connecting the inlet port and the pilot chamber, and
   a pilot pressure discharge solenoid valve is disposed in a flow path through which a pressure fluid in the pilot chamber is discharged to an exterior, and wherein
   the fluid pressure control device further comprises a control unit configured to control the pilot pressure supply solenoid valve and the pilot pressure discharge solenoid valve,
   wherein, for any and all positions of displacement of the supply valve, the fluid pressure control device does not comprise a flow path through which the pressure fluid that has passed through a gap between the valve element and a valve seat of the supply valve is discharged to the exterior, and
   the standby mode is a mode for preparing return of the fluid actuator in a paused state to an operating state.

2. The fluid pressure control device according to claim 1, wherein, when a flow rate flowing toward the fluid actuator continuously falls below a predetermined value for a predetermined time period, a transition is made from the normal mode to the standby mode.

3. The fluid pressure control device according to claim 1, wherein a transition is made from the normal mode to the standby mode in accordance with changing of a mode switching signal input from the exterior, after a flow rate flowing toward the fluid actuator has continuously fallen below a predetermined value for a predetermined time period.

4. The fluid pressure control device according to claim 2, further comprising a first pressure sensor configured to detect a pressure in the outlet port, wherein
   the control unit controls the pilot pressure supply solenoid valve and the pilot pressure discharge solenoid valve to adjust the pressure in the outlet port detected by the first pressure sensor to the operating pressure or the standby pressure.

5. The fluid pressure control device according to claim 4, further comprising a second pressure sensor configured to detect a pressure in the pilot chamber, wherein
   the control unit estimates the flow rate flowing toward the fluid actuator based on a detection signal of the first pressure sensor and a detection signal of the second pressure sensor.

6. The fluid pressure control device according to claim 5, wherein the flow rate flowing toward the fluid actuator is estimated using a following expression:

$$Qe = K(P1-P2)$$

where Qe represents an estimated flow rate, P1 represents the pressure in the pilot chamber, P2 represents the pressure in the outlet port, and K represents a constant corresponding to a set value of the operating pressure.

7. The fluid pressure control device according to claim 5, wherein the flow rate flowing toward the fluid actuator is estimated using a following expression:

$$Qe = K'(P1-P2)$$

where Qe represents an estimated flow rate, P1 represents the pressure in the pilot chamber, P2 represents the pressure in the outlet port, and K' represents a constant corresponding to a set value of the operating pressure, a pressure in the inlet port, and a temperature of the pressure fluid passing through the supply valve.

8. The fluid pressure control device according to claim 3, further comprising a first pressure sensor configured to detect a pressure in the outlet port, wherein
   the control unit controls the pilot pressure supply solenoid valve and the pilot pressure discharge solenoid valve to adjust the pressure in the outlet port detected by the first pressure sensor to the operating pressure or the standby pressure.

9. The fluid pressure control device according to claim 8, further comprising a second pressure sensor configured to detect a pressure in the pilot chamber, wherein
   the control unit estimates the flow rate flowing toward the fluid actuator based on a detection signal of the first pressure sensor and a detection signal of the second pressure sensor.

10. The fluid pressure control device according to claim 9, wherein the flow rate flowing toward the fluid actuator is estimated using a following expression:

$$Qe = K(P1-P2)$$

where Qe represents an estimated flow rate, P1 represents the pressure in the pilot chamber, P2 represents the pressure in the outlet port, and K represents a constant corresponding to a set value of the operating pressure.

11. The fluid pressure control device according to claim 9, wherein the flow rate flowing toward the fluid actuator is estimated using a following expression:

$$Qe = K'(P1-P2)$$

where Qe represents an estimated flow rate, P1 represents the pressure in the pilot chamber, P2 represents the pressure in the outlet port, and K' represents a constant corresponding to a set value of the operating pressure, a pressure in the inlet port, and a temperature of the pressure fluid passing through the supply valve.

12. The fluid pressure control device according to claim 1, wherein, when the fluid pressure control device is operating in the normal mode, and in a case that a pressure in the outlet port is greater than the operating pressure and a pressure in the pilot chamber is less than or equal to a predetermined value which is slightly greater than atmospheric pressure, the pilot pressure discharge solenoid valve is set to a shutoff position.

13. The fluid pressure control device according to claim 1, wherein, when the fluid pressure control device is operating in the standby mode and in a case that a pressure in the outlet port is greater than the standby pressure and a pressure in the pilot chamber is less than or equal to a predetermined value which is slightly greater than atmospheric pressure, the pilot pressure discharge solenoid valve is set to a shutoff position.

14. The fluid pressure control device according to claim 1, wherein returning from the standby mode to the normal mode is carried out in accordance with a standby release signal, or a change in a mode switching signal.

15. The fluid pressure control device according to claim 2, wherein returning from the standby mode to the normal mode is carried out when the flow rate flowing toward the fluid actuator becomes greater than the predetermined value.

16. The fluid pressure control device according to claim 3, wherein returning from the standby mode to the normal mode is carried out when the flow rate flowing toward the fluid actuator becomes greater than the predetermined value.

17. The fluid pressure control device according to claim 1, wherein returning from the standby mode to the normal mode is carried out by changing a set pressure from the standby pressure to the operating pressure in a stepwise manner.

18. The fluid pressure control device according to claim 1, wherein a set value of the operating pressure and a set value of the standby pressure can be arbitrarily changed.

19. The fluid pressure control device according to claim 1, wherein a transition is made from the normal mode to the standby mode in accordance with a change in a mode switching signal input from the exterior.

* * * * *